US008656492B2

(12) United States Patent
Boot et al.

(10) Patent No.: US 8,656,492 B2
(45) Date of Patent: *Feb. 18, 2014

(54) SYSTEMS, METHODS, AND APPARATUS FOR NETWORK INTRUSION DETECTION

(75) Inventors: John Boot, Sandy Springs, GA (US);
Matthew Thomson, Marietta, GA (US);
Bradley Richard Ree, Cumming, GA (US)

(73) Assignee: General Electric Company, Schenectady, NY (US)

( * ) Notice: Subject to any disclaimer, the term of this patent is extended or adjusted under 35 U.S.C. 154(b) by 161 days.

This patent is subject to a terminal disclaimer.

(21) Appl. No.: 13/108,342

(22) Filed: May 16, 2011

(65) Prior Publication Data

US 2012/0297482 A1 Nov. 22, 2012

(51) Int. Cl.
*H04L 29/06* (2006.01)

(52) U.S. Cl.
USPC .......... 726/23; 726/1; 726/2; 726/13; 726/14; 726/22; 726/24; 726/25; 713/154; 713/187; 713/188; 709/224; 709/230; 709/231; 709/232

(58) Field of Classification Search
USPC .......... 726/11–17, 22–25, 1–4; 713/187–188, 713/153–154; 709/217–237
See application file for complete search history.

(56) References Cited

U.S. PATENT DOCUMENTS

| 6,259,911 | B1 * | 7/2001 | Bims et al. ..................... 455/423 |
| 6,496,935 | B1 * | 12/2002 | Fink et al. ....................... 726/13 |
| 6,957,259 | B1 * | 10/2005 | Malik ............................ 709/225 |
| 6,959,328 | B1 * | 10/2005 | Gillaspy et al. ................ 709/220 |
| 7,596,810 | B2 * | 9/2009 | Kim et al. ........................ 726/22 |
| 7,694,128 | B2 * | 4/2010 | Judge et al. ..................... 713/152 |
| 7,830,874 | B2 * | 11/2010 | Cornwall et al. ............. 370/389 |
| 2002/0103937 | A1 * | 8/2002 | Tillmann et al. .............. 709/246 |
| 2003/0074578 | A1 * | 4/2003 | Ford et al. ...................... 713/200 |
| 2004/0049698 | A1 | 3/2004 | Ott et al. |
| 2004/0123150 | A1 * | 6/2004 | Wright et al. .................. 713/201 |
| 2008/0040788 | A1 * | 2/2008 | Steinkogler et al. ........... 726/11 |
| 2008/0077990 | A1 * | 3/2008 | Bednar et al. .................. 726/24 |

(Continued)

OTHER PUBLICATIONS

Intrusion Detection for Advanced Metering Infrastructures: Requirements and Architectural Directions by Berthier et al; Publisher: IEEE; Year: 2010.*

(Continued)

*Primary Examiner* — Madhuri Herzog
(74) *Attorney, Agent, or Firm* — Sutherland Asbill & Brennan LLP

(57) ABSTRACT

Systems, methods, and apparatus for network intrusion detection are provided. A device configured to facilitate network intrusion detection may include at least one memory and at least one processor. The at least one memory may be configured to store computer-executable instructions. The at least one processor may be configured to access the at least one memory and execute the computer-executable instructions to (i) identify a communication, the communication comprising one of (a) a communication received by the device or (b) a communication generated by the device; (ii) identify a type associated with the communication; (iii) determine, based at least in part upon the identified type, a list of acceptable content for the communication; (iv) analyze, based at least in part upon the determined list, the content of the communication; and (v) determine, based at least in part upon the analysis, whether the content is acceptable content.

17 Claims, 5 Drawing Sheets

(56) References Cited

U.S. PATENT DOCUMENTS

| | | |
|---|---|---|
| 2009/0119743 A1 | 5/2009 | Werner et al. |
| 2009/0193086 A1* | 7/2009 | Lingafelt et al. ............... 709/206 |
| 2010/0177753 A1* | 7/2010 | Bahr ............................. 370/338 |
| 2011/0312351 A1* | 12/2011 | Zabawskyj et al. ........... 455/466 |
| 2012/0047550 A1* | 2/2012 | Lee et al. ........................ 726/1 |
| 2012/0151589 A1* | 6/2012 | Hershey et al. ................ 726/24 |

OTHER PUBLICATIONS

Spafford E H et al, "Intrusion detection using autonomous agents", Computer Networks, Elsevier Science Publishers B.V., Oct. 1, 2000, pp. 547-570, vol. 34, No. 4, Amsterdam, NL.

Search Report and Written Opinion from EP Application No. 12167977.3 dated Sep. 3, 2012.

* cited by examiner

SYSTEMS, METHODS, AND APPARATUS FOR NETWORK INTRUSION DETECTION

CROSS-REFERENCE TO RELATED APPLICATION

This application is related to patent application Ser. No. 13/108,289, filed May 16, 2011 and entitled "Systems, Methods, and Apparatus for Network Intrusion Detection."

FIELD OF THE INVENTION

Embodiments of the invention relate generally to network security, and more specifically to systems, methods, and apparatus for detecting network intrusions.

BACKGROUND OF THE INVENTION

Networks are utilized in a wide variety of applications to route data between various network devices. For example, various types of networks are utilized in utility applications, medical applications, and industrial control applications. Utilizing the example of a utility application, mesh networks are typically utilized to route data between utility meters. Additionally, networks associated with an Advanced Metering Infrastructure ("AMI") are typically utilized to route meter data to central control devices and central servers. Other types of networks are also utilized to route data between power generation devices, power plants, and operational controllers.

Security is typically a primary concern within any network. To facilitate network security, certain conventional systems may analyze communications in order to determine whether the communications include invalid content or blacklisted data. However, it is typically impractical and time consuming to update and maintain lists of blacklisted data or invalid content. Accordingly, improved systems, methods, and apparatus for network intrusion detection are desirable.

BRIEF DESCRIPTION OF THE INVENTION

Some or all of the above needs and/or problems may be addressed by certain embodiments of the invention. Embodiments of the invention may include systems, methods, and apparatus for network intrusion detection. According to one embodiment of the invention, there is disclosed an apparatus or device, such as a utility meter, configured to facilitate intrusion detection within a network. The device may include at least one memory and at least one processor. The at least one memory may be configured to store computer-executable instructions. The at least one processor may be configured to access the at least one memory and execute the computer-executable instructions to (i) identify a communication, the communication comprising one of (a) a communication received by the device or (b) a communication generated by the device; (ii) identify a type associated with the communication; (iii) determine, based at least in part upon the identified type, a list of acceptable content for the communication; (iv) analyze, based at least in part upon the determined list, the content of the communication; and (v) determine, based at least in part upon the analysis, whether the content is acceptable content.

According to another embodiment of the invention, there is disclosed a method for network intrusion detection. A communication may be identified. The communication may be one of (i) a communication received by a device or (ii) a communication generated by the device. A type associated with the communication may be identified. Based at least in part upon the identified type, a list of acceptable content may be identified. Based at least in part upon the determined list, the content of the communication may be analyzed. Based at least in part upon the analysis, a determination may be made as to whether the content is acceptable content. In certain embodiments, the above operations may be performed by a communication inspection application executed by one or more processors associated with the device.

Additional systems, methods, apparatus, features, and aspects are realized through the techniques of various embodiments of the invention. Other embodiments and aspects of the invention are described in detail herein and are considered a part of the claimed invention. Other embodiments, features, and aspects can be understood with reference to the description and the drawings.

BRIEF DESCRIPTION OF THE DRAWINGS

Figure 1:
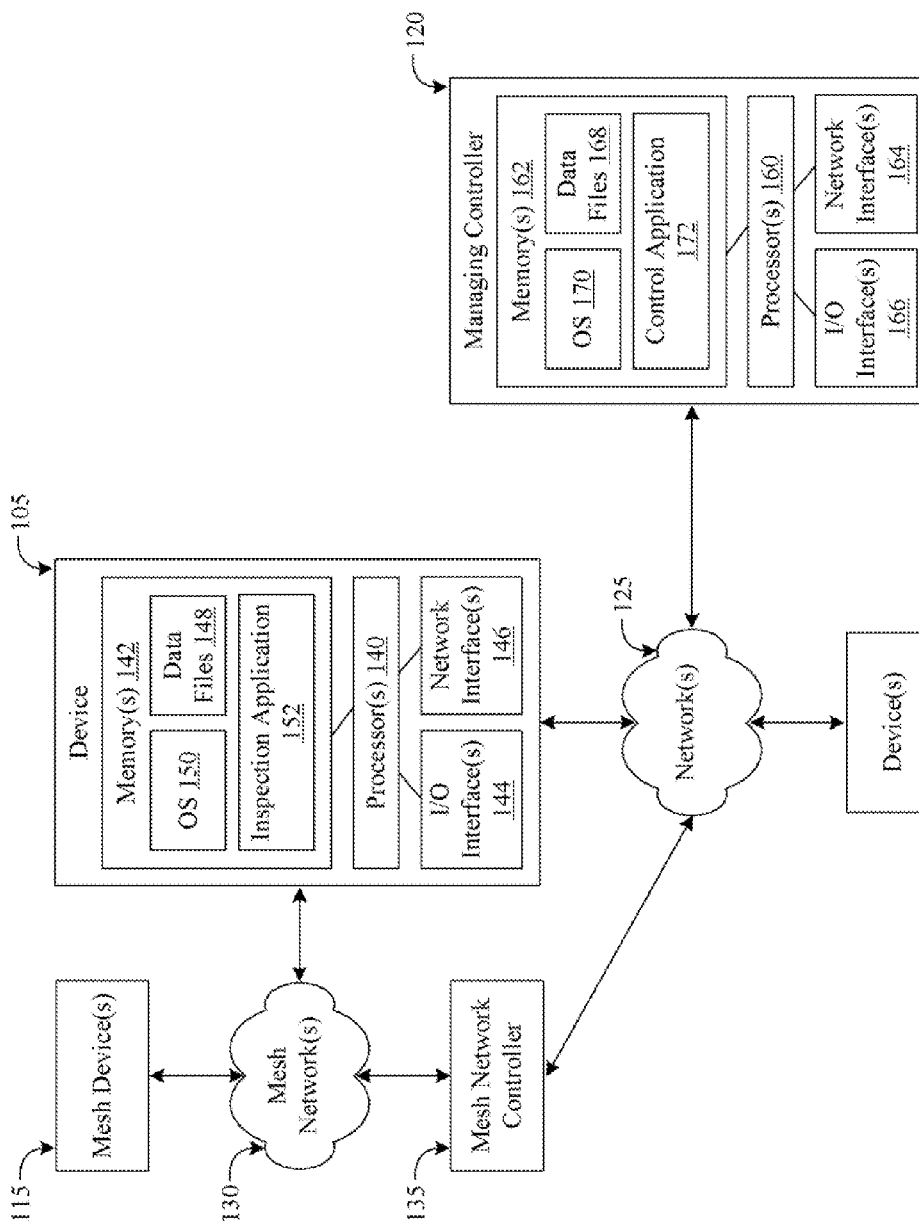

Having thus described the invention in general terms, reference will now be made to the accompanying drawings, which are not necessarily drawn to scale, and wherein:

FIG. 1 is a block diagram of one example system that facilitates network intrusion detection, according to an illustrative embodiment of the invention.

Figure 2:
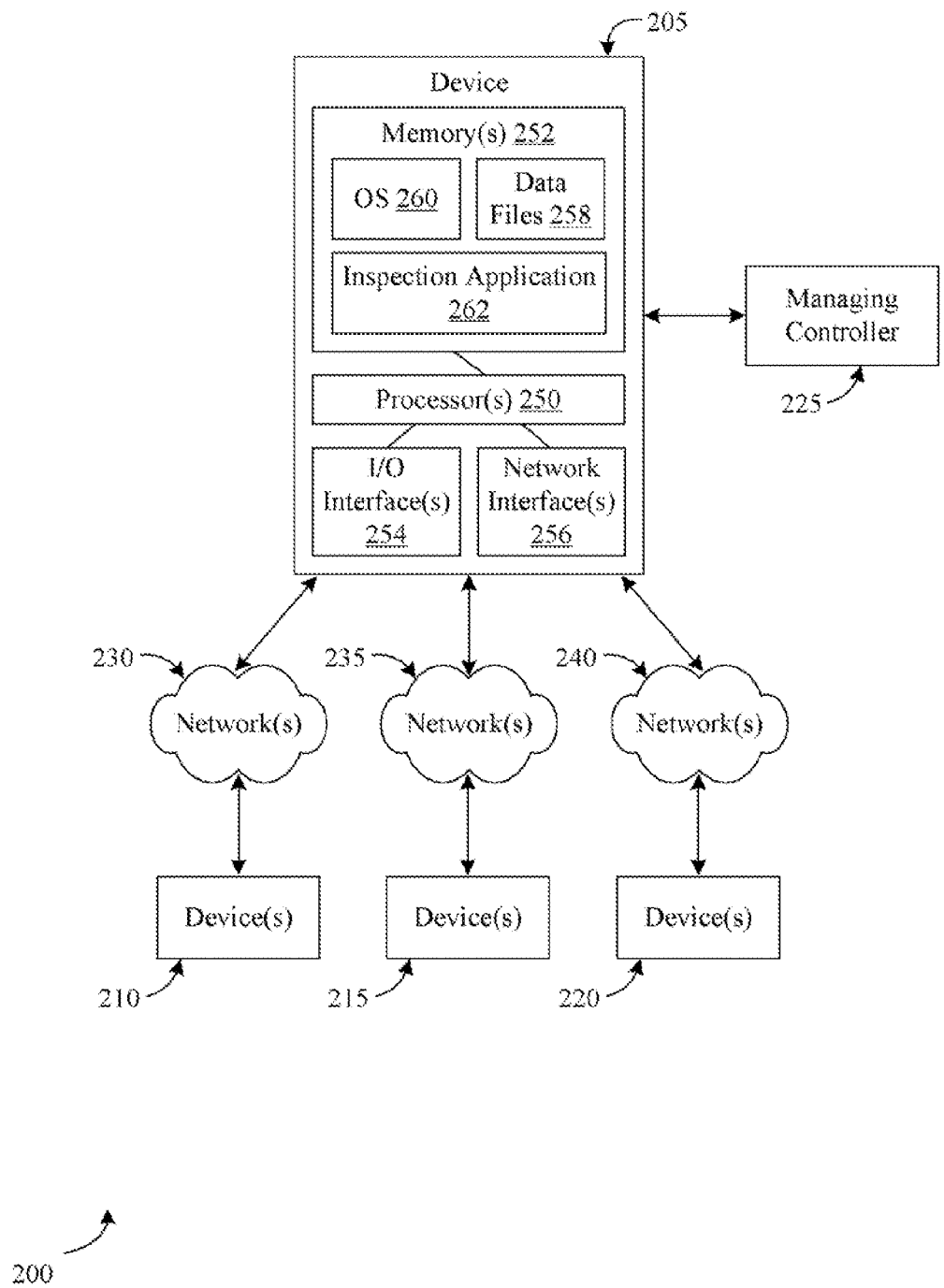

FIG. 2 is a block diagram of another example system that facilitates network intrusion detection, according to an illustrative embodiment of the invention.

Figure 3:
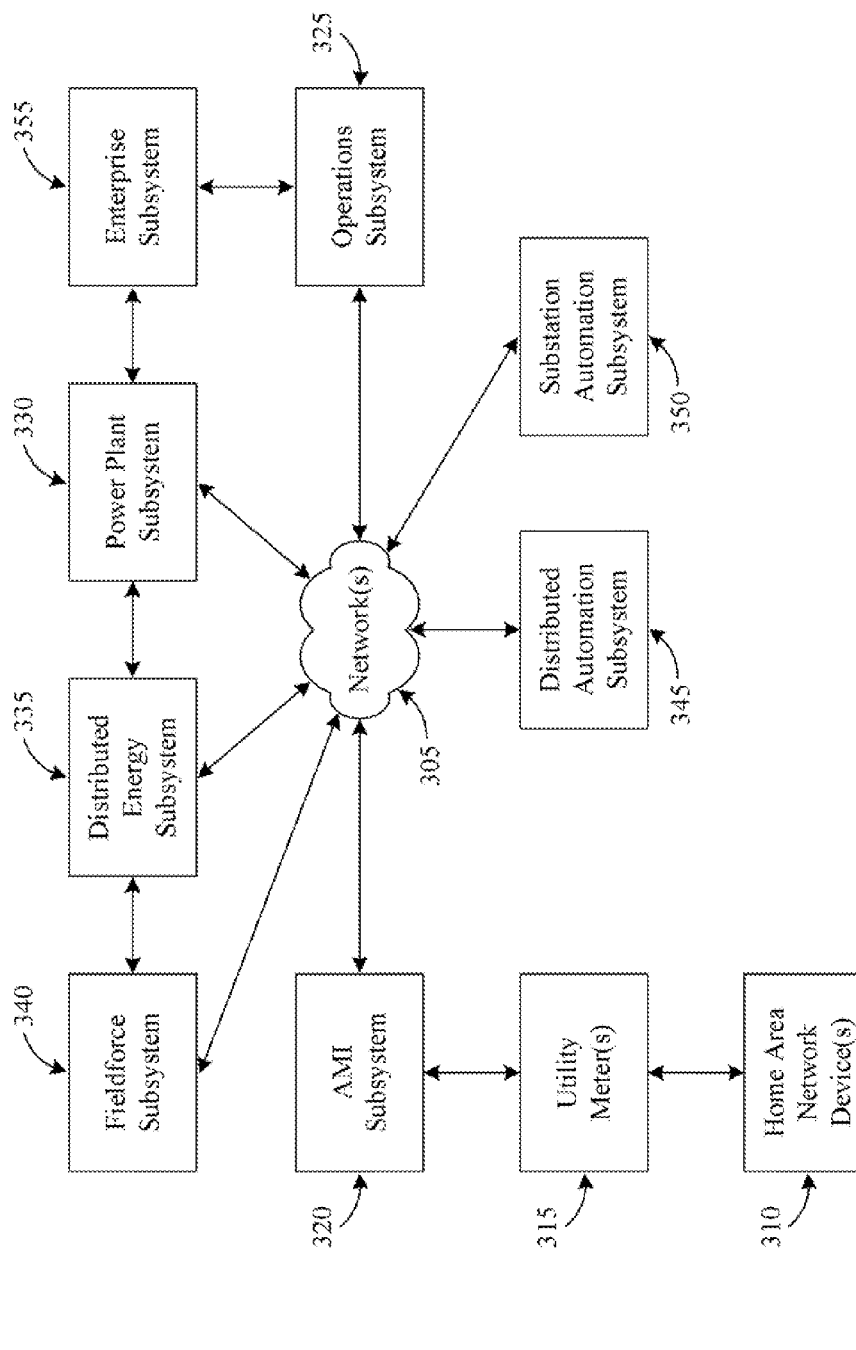

FIG. 3 is a block diagram of an example utility application in which various embodiments of the invention may be utilized.

Figure 4:
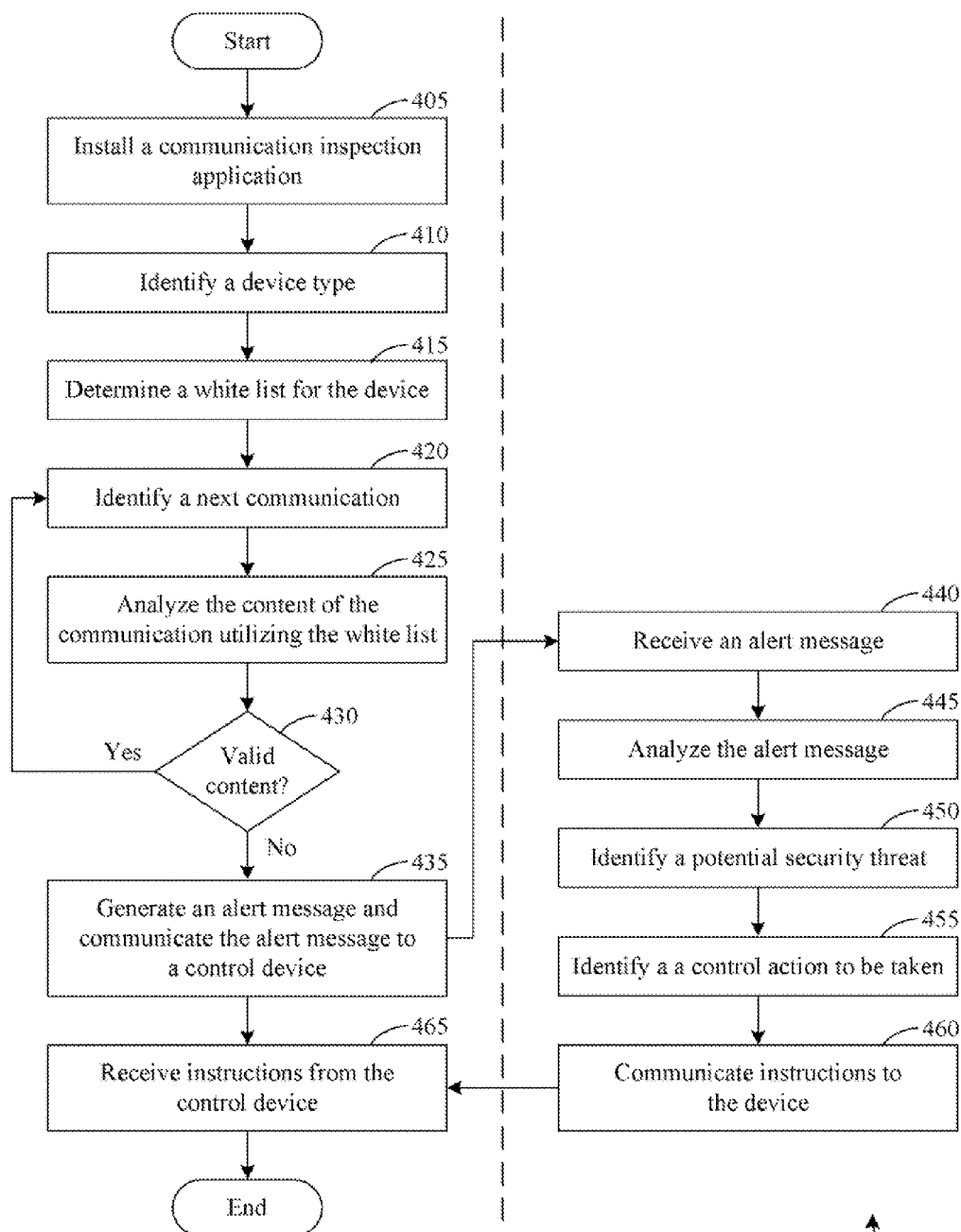

FIG. 4 is a flow diagram of an example method for analyzing communications to facilitate network intrusion detection, according to an illustrative embodiment of the invention.

Figure 5:
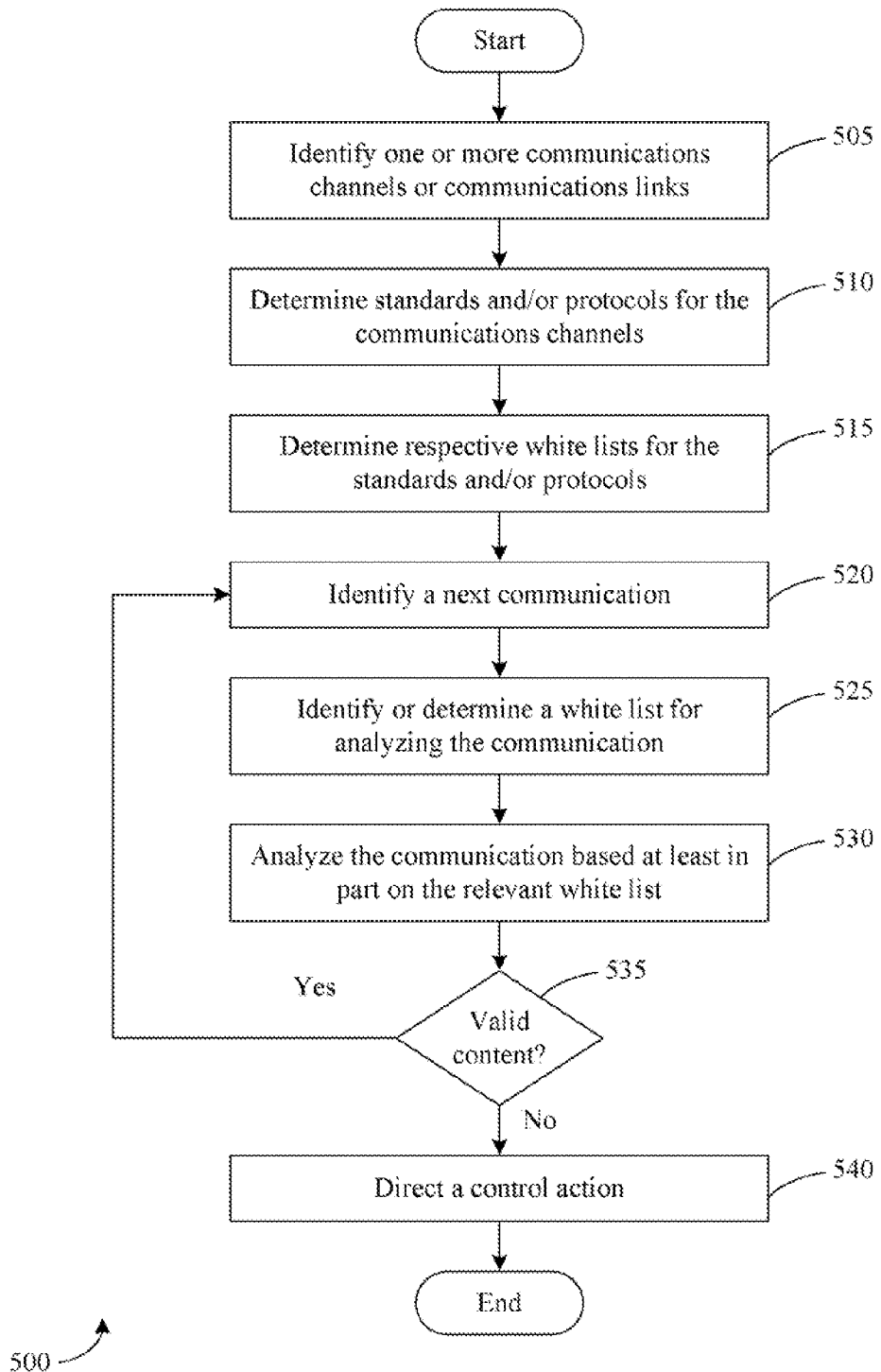

FIG. 5 is a flow diagram of another example method for analyzing communications to facilitate network intrusion detection, according to an illustrative embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are systems, methods, and apparatus for network intrusion detection. In one example embodiment of the invention, one or more devices may be in communication via any number of suitable networks. For example, one or more utility devices (e.g., utility meters, AMI devices, distribution automation devices, utility field force devices, substation automation devices, etc.) may be in communication via any number of suitable networks (e.g., mesh networks, AMI networks, local area networks, wide area networks, cellular networks, etc.). As another example, one or more medical devices may be in communication via any number of suitable networks, such as a proprietary medical network. Each device may be configured to identify communications and analyze the content of the communications utilizing an identified or determined list of acceptable content (i.e., a white list of acceptable content and/or metadata). In certain embodiments, the acceptable content may be determined based upon one or more established standards and/or protocols for network communication and/or device message metadata associated with the device. Based at least in part upon the analysis, a determination may be made as to whether the content is acceptable content. If it is determined that the content is not acceptable, then a potential network intrusion may be identified. In this regard, network security may be provided based upon the comparison of communication content to a predetermined list of acceptable content.

In certain embodiments, a device may be configured to store and execute a special purpose application that facilitates an analysis of content. The application may facilitate the identification of a type associated with the device (e.g., a device model number, etc.) and the identification of one or more communications interfaces and/or network interfaces utilized by the device or associated with the device type. Based at least in part upon the identifying information, the application may determine or identify a list, such as a white list, of acceptable content that may be included in communications received by and/or generated by the device. For example, the application may determine acceptable content associated with one or more established standards for device communications and/or device message metadata. Once a communication is identified by the device, the application may identify a message type associated with the communication, and the application may determine a list of acceptable content (e.g., a white list) based at least in part upon the identified message type. The application may then utilize a deep packet inspection to determine the content of the communication and evaluate the content utilizing the list of acceptable content. For example, when a packet-based protocol is utilized (e.g., an Internet Protocol, etc.), a deep packet inspection may be performed in order to inspect one or more packets associated with a communication. Based at least in part upon the evaluation or analysis, the application may determine whether the content is acceptable content.

As one example, the special purpose application may be installed on a utility meter. The utility meter may receive and transmit data in a standard format, such as a proprietary vendor format or an industry standard format. Accordingly, data communicated to or from the utility meter may have a relatively limited set of valid permutations. For example, a communication may include a meter number having a predetermined length and format, a reading having a predetermined length and format, and a structure that determines a sequence of the data components of the communication. The application may utilize the established standard to generate a white list of acceptable data, metadata, and/or permutations of data received in communications. The application may then utilize the white list to analyze the content of communications in order to determine whether the communications include acceptable content.

In various embodiments, a device may be configured to generate an alert, such as a security alert, based upon the identification of invalid or unacceptable content included in an analyzed communication. In certain embodiments, a generated alert may be communicated to a managing server or managing controller (e.g., a central controller, etc.) for processing and/or analysis. For example, a utility meter may communicate a generated alert to a managing control (e.g., an AMI controller, etc), and the managing controller may process the generated alert in order to identify and/or act upon any potential security threat. In other embodiments, a generated alert may be processed by the device, and the device may take one or more control actions based upon the generated alert. For example, in the event that a managing controller generates an alert based upon the analysis of communications, the managing control may identify a potential security threat and take one or more control actions based upon the identification. A wide variety of control actions may be taken as desired in various embodiments of the invention. Suitable control actions include, but are not limited to, identifying an originating device for a communication, blocking communications received from the originating device, redirecting communications, dispatching an operator to investigate the originating device, etc.

Various embodiments of the invention may include one or more special purpose computers, systems, and/or particular machines that facilitate network intrusion detection. A special purpose computer or particular machine may include a wide variety of different software modules as desired in various embodiments. As explained in greater detail below, in certain embodiments, these various software components may be utilized to detect potential network intrusions and/or security risks within a network.

As desired in various embodiments of the invention, a device that detects network intrusions may be a stand-alone device connected to one or more networks. In other embodiments, network intrusion detection functionality may be incorporated into one or more existing devices.

Certain embodiments of the invention described herein may have the technical effect of detecting network intrusions, such as network intrusions within a utility network or a medical network, based upon a comparison of communications to one or more lists of acceptable content. Additionally, embodiments of the invention may have the technical effect of taking one or more control actions to correct or otherwise respond to a detected network intrusion or another identified security threat.

FIG. 1 is a block diagram of one example system 100 for detecting network intrusion, according to an illustrative embodiment of the invention. The system 100 illustrated in FIG. 1 may include any number of devices 105, 110, 115 and at least one managing controller 120. Any number of networks 125, 130 may be utilized to facilitate communication between various components of the system 100. For example, as shown in FIG. 1, a device 105 may be in communication with any number of other devices 110 and/or the managing controller 120 via one or more suitable networks 125, such as a utility network, a medical network, an industrial control network, a local area network, a wide area network, a cellular network, etc. As another example, the device 105 may be a suitable mesh network device in communication with any number of other mesh devices 115 and/or a mesh network controller 135 via any number of suitable mesh networks 130. As desired, the mesh network controller 135 may communicate with the managing controller 120 via any number of suitable networks 125.

Indeed, a wide variety of network configurations and arrangements may be utilized as desired in various embodiments of the invention. For example, one or more network configurations may be associated with a utility provider. As one example, any number of local and/or wide area networks may facilitate communications between the control devices. Additionally, any number of mesh networks 130 may include mesh nodes and/or devices associated with an AMI system. For example, utility meters and/or other sensors may be part of an AMI system that monitors utility usage, such as gas, water, and/or electricity usage. As desired, components of the AMI system may communicate with mesh network controllers 135, and the mesh network controllers 135 may communicate information to monitoring utilities, such as one or more utilities associated with the managing controller 120. A mesh network 130 may include any number of mesh devices. A mesh device may be any suitable device configured to participate as a node within the mesh network 130, such as a utility meter, a mesh network controller 135, mesh repeaters, and/or other mesh nodes. Each mesh node may act as an independent router to allow for continuous connections and reconfiguration around broken or blocked paths by "hopping" from node to node until the destination is reached.

As another example, one or more network configurations may be associated with a medical system and/or a medical provider. For example, a proprietary medical network, the Internet, or another network may be utilized to facilitate communication between various medical devices, such as patient monitoring devices, physician devices, benefit provider devices, pharmacy devices, and/or various managing controllers and/or service providers. As yet another example, one or more network configurations may be associated with an industrial control system. For example, various networks may facilitate communications between managing controllers, distributed control systems, and/or distributed sensors and/or field automation devices.

As stated above, any number of devices 105, 110, 115 may be in communication with one another and/or the managing controller 120. An example device 105 will now be described in greater detail. The device 105 may be any suitable device that may be connected to a network, such as a suitable utility meter, AMI device, industrial control device, field automation device, medical device, or other device. As such, the device 105 may optionally be configured to measure or monitor various parameters (e.g., electrical usage, voltage, current, temperature, etc.). As desired, measurements data and/or other data may be communicated by the device 105 to other devices and/or components of the system 100. Additionally, in accordance with an aspect of the invention, the device 105 may evaluate communications generated by and/or received by the device 105 to determine whether the content of the communications is acceptable content.

The device 105 may include any number of suitable computer processing components that facilitate the general operation of the device 105 and/or the evaluation of communications for network intrusion detection purposes. For example, the device 105 may include one or more controllers or processing devices configured to monitor and evaluate communications. Examples of suitable processing devices that may be incorporated into a device 105 include, but are not limited to, application-specific circuits, microcontrollers, minicomputers, other computing devices, and the like. As such, the device 105 may include any number of processors 140 that facilitate the execution of computer-readable instructions to control the operations of the device 105 and the detection of potential network intrusions. By executing computer-readable instructions, the device 105 may include or form a special purpose computer that facilitates network intrusion detection.

In addition to one or more processor(s) 140, the device 105 may include one or more memory devices 142, one or more input/output ("I/O") interfaces 144, and/or one or more network interface devices 146. The one or more memory devices 142 or memories may be any suitable memory devices, for example, caches, read-only memory devices, random access memory devices, magnetic storage devices, etc. The one or more memory devices 142 may store data, executable instructions, and/or various program modules utilized by the device 105, for example, data files 148, an operating system ("OS") 150, and/or an inspection application 152 or inspection module. The data files 148 may include, for example, information associated with the operation of the device 105, information associated with one or more established communications standards associated with the device 105, one or more generated lists of acceptable content (e.g., white lists, etc.), information associated with generated alert messages, and/or data associated with measurements and/or readings taken by the device 105.

In certain embodiments of the invention, the device 105 may include any number of software applications or modules that are executed to facilitate the operations of the device 105. The software applications may include computer-readable instructions that are executable by the one or more processors 140. The execution of the computer-readable instructions may form a special purpose computer that facilitates the operations of the device 105 as well as network intrusion detection. As an example of a software application, the device 105 may optionally include an OS 150 that controls the general operation of the device 105 and that facilitates the execution of additional software applications.

Additionally, the device 105 may include an inspection application 152 or inspection module. The inspection application 152 may be a suitable software module configured to facilitate the identification and processing of communications or messages generated by and/or received by the device 105. In operation, the inspection application 152 may build or generate one or more lists of acceptable content for the device 105. For example, the inspection application 152 may identify a type associated with the device 105 and/or information associated with one or more networks that facilitate device communications. The inspection application 152 may utilize at least a portion of this information to generate one or more lists of acceptable content. For example, the inspection application 152 may identify one or more established communications standards, metadata standards, and/or protocols for the device type and/or the networks, and the inspection application 152 may utilize the identified standards and/or protocols to generate one or more lists of acceptable content. The lists of acceptable content may include a wide variety of information, such as valid permutations, formats, lengths, and/or structures for device communications and/or metadata associated with device communications. As an alternative to generating a list of acceptable content, the inspection application 152 may identify a list of acceptable content that has been previously stored on the device 105, or the inspection application 152 may obtain a list of acceptable content from an external source. For example, the inspection application 152 may obtain a list of acceptable content from a removable storage device. As another example, the inspection application 152 may obtain a list of acceptable content from an external source (e.g., the managing controller 120) via any number of suitable network communications.

Once one or more lists of acceptable content have been generated and/or obtained, the inspection application 152 may utilize the one or more lists to analyze or evaluate communications generated by and/or received by the device 105. For example, the inspection application 152 may perform a deep packet inspection of the content (e.g., data payload, etc.) of a communication, and the content may be compared to a list of acceptable content and/or otherwise evaluated utilizing a list of acceptable content. Based at least in part upon the evaluation, the inspection application 152 may determine whether the content is acceptable or valid content. If the content is determined to be acceptable content, then the inspection application 152 may approve the communication. If, however, the content is determined to be unacceptable or invalid content (e.g., the content does not match approved content, the content does not satisfy one or more parameters for approved content, etc.), then the inspection application 152 may generate an alert associated with the communication. In certain embodiments, the inspection application 152 may direct communication of an alert message to the managing controller 120 for further processing. In this regard, the managing controller 120 may determine whether a network intrusion has occurred, and the managing controller 120 may direct one or more control actions in response to the determination. For example, the managing controller 120 may communicate instructions to the device 105 for processing future communications. In other embodiments, the inspection application 152 may direct one or more control actions in response to a generated alert. A wide variety of control actions may be taken as desired in various embodiments of the invention. A few example control actions are discussed in greater detail below with reference to the managing controller 120.

Indeed, the inspection application 152 may perform a wide variety of different operations to evaluate communications and determine whether the content included in the communications is acceptable or valid content. The operations described above are provided by way of example only. Another example of the operations that may be performed by the inspection application 152 is described in greater detail below with reference to FIG. 4.

With continued reference to the device 105, the one or more I/O interfaces 144 may facilitate communication between the device 105 and one or more input/output devices, for example, one or more user interface devices, such as a display, keypad, mouse, pointing device, control panel, touch screen display, microphone, speaker, etc., that facilitate user interaction with the device 105. In this regard, user commands may be received by the device 105. Additionally, the one or more network interface devices 146 may facilitate connection of the device 105 to any number of suitable networks, such as a mesh network 130 or other type of network 125. In this regard, the device 105 may receive data from and/or communicate data to other components of the system 100. In certain embodiments, the network interface devices 146 may include a mesh radio configured to communicate with the mesh network 130. The radio may transmit, receive, and forward messages to other nodes of the mesh network 130. Additionally, as desired in certain embodiments, the network interface devices 146 may include any suitable communications interfaces, network cards, and/or other devices configured to communicate with other devices 110 and/or the managing controller 120 via any number of wide area networks or other networks. For example, the network interface devices 146 may include Ethernet cards, network interface cards, cellular transceivers, broadband over power line adaptors, and/or other devices.

In certain embodiments, the device 105 may be configured to communicate via a mesh network 130. As desired, a mesh network controller 135 may be configured to facilitate communication between the device 105 and the managing controller 120. The mesh network controller 135 may be a suitable processor-driven device configured to function as an interface between the mesh network 130 and the networks 125 that facilitate communication with the managing controller 120. As such, the mesh network controller 135 may include components similar to those described for the device 105 and/or the managing controller 120. For example, the mesh network controller 135 may include one or more processors, one or more memories, and/or one or more network interface devices. In operation, the mesh network controller 135 may receive messages from mesh devices via the mesh network 130, and the mesh network controller 135 may selectively communicate the received messages to the managing controller 120 via one or more wide area networks 125. Communications may be routed from the managing controller 120 to the mesh devices in a similar manner.

As desired, the mesh network controller 135 may evaluate or analyze communications in a similar manner as that described for the device 105. For example, the mesh network controller 135 may include a suitable inspection module or inspection application that identifies one or more lists of acceptable content and utilizes the one or more lists to determine whether the content included in identified communications is acceptable content. As a result, the mesh network controller 135 may selectively generate alert messages in the event that invalid or unacceptable content is identified. Additionally, in certain embodiments, the mesh network controller 135 may take one or more control actions based upon the generation of an alert and/or based upon the receipt of an alert message from a mesh device.

With continued reference to FIG. 1, the managing controller 120 may form or be a part of a suitable system associated with the device 105. For example, in the event that the device 105 is a utility meter or a field automation device, the managing controller 120 may be associated with a power substation or other utility system. The managing controller 120 may include any number of suitable computer processing components that facilitate the receipt and processing of alert messages, the direction of control actions based upon intrusion detection, and/or the communication of data and/or instructions to any number of devices. Examples of suitable processing devices that may be incorporated into a managing controller 120 include, but are not limited to, application-specific circuits, microcontrollers, minicomputers, personal computers, servers, other computing devices, and the like. As such, a managing controller 120 may include any number of processors 160 that facilitate the execution of computer-readable instructions to control the operations of the managing controller 120. By executing computer-readable instructions, the managing controller 120 may include or form a special purpose computer that facilitates the receipt and processing of alert messages in order to identify potential network intrusions.

In addition to one or more processor(s) 160, the managing controller 120 may include one or more memory devices 162, one or more network interface devices 164, and/or one or more input/output ("I/O") interfaces 166. The one or more memory devices 162 or memories may be any suitable memory devices, for example, caches, read-only memory devices, random access memory devices, magnetic storage devices, etc. The one or more memory devices 162 may store data, executable instructions, and/or various program modules utilized by the managing controller 120, for example, data files 168, an operating system ("OS") 170, and/or a control application 172 or control module. The data files 168 may include stored data associated with the operation of the managing controller 120, information associated with received alert messages, information associated with identified intrusions and/or intrusion device nodes, information associated with control actions taken by the managing controller 120, information associated with acceptable content, and/or information associated with the analysis or evaluation of communications.

The OS 170 may be a suitable software module or application that executes computer-executable instructions to control the general operation of the managing controller 120 and to facilitate the execution of additional software applications. The control application 172 may be a suitable software module or application that executes computer-executable instructions to facilitate administration of and/or communication with any number of distributed devices and/or network devices. In this regard, the control application 172 may be configured to receive and process data output by devices, such as device 105, and/or other components of the system 100. For example, in a utility application, the control application 172 may be configured to receive and process measurements data, status messages, and/or alert messages output by one or more utility meters and/or field automation devices. The control application 172 may additionally be configured to communicate messages, instructions, and/or updates to any number of other devices and/or components of the system 100.

According to an aspect of the invention, the control application 172 may be configured to receive and process one or more alert messages associated with identified invalid or unacceptable content. Based upon an analysis of the received alert messages, the control application 172 may identify potential security threats and/or network intrusions. As desired, the control application 172 may additionally identify a location or approximate location for a device that poses a potential security threat. Once a potential security threat has been identified, the control application 172 may direct or trigger the execution of any number of control actions associated with the potential security threat. In this regard, the control application 172 may enhance security within one or more networks and respond to intrusion detections. A wide variety of control actions may be directed as desired in various embodiments of the invention. For example, a technician or group of technicians may be dispatched to evaluate a potential security threat. As another example, communications to and/or from a device that poses a potential security threat may be limited or disallowed. One example of the operations that may be performed by the control application 172 is described in greater detail below with reference to FIG. 4.

Additionally, in certain embodiments, the managing controller 120 may be configured to compile and/or generate one or more lists of acceptable content in a similar manner as that described for the device. The managing controller 120 may then utilize the one or more lists to evaluate communications received by and/or generated by the managing controller 120 in order to determine whether the content of the communications is valid or acceptable content. In certain embodiments, a plurality of networks and/or network interfaces may be associated with the managing controller 120. For example, a managing controller associated with a utility provider may be configured to communicate via multiple types of networks utilizing a wide variety of communication protocols, such as an AMI protocol and/or a Foundation Fieldbus protocol. As desired, the managing controller 120 may generate lists of acceptable content for any number of different interfaces and selectively utilize one or more appropriate lists to evaluate communications. For example, the managing controller 120 may function in a similar manner as the device 205 described in greater detail below with reference to FIG. 2.

With continued reference to the managing controller 120, the one or more network interface devices 164 may facilitate connection of the managing controller 120 to any number of networks, such as one or more wide area networks 125. In this regard, the managing controller 120 may receive data from and/or communicate data to other components of the system 100, such as the mesh network controller 135 and/or other components configured to communicate via the networks 125. Additionally, the one or more I/O interfaces 166 may facilitate communication between the managing controller 120 and one or more input/output devices, for example, one or more user interface devices, such as a display, keypad, control panel, touch screen display, remote control, microphone, etc., that facilitate user interaction with the managing controller 120.

The one or more networks 125 may include any number of suitable networks that facilitate communication between the various components of the system 100, such as the managing controller 120, certain devices 105, 110, and/or the mesh network controller 135. For example, the one or more networks 125 may include any number of suitable wide area networks and/or local area networks, such as the Internet, a cellular network (e.g., 2G, 3G, 4G, etc), a digital subscriber line ("DSL") network, a fiber optic network, a wireless network (e.g., an 802.11 network, an 802.16 network, etc.) a Wi-Fi enabled network, a Bluetooth-enabled network, a broadband over power line network, a satellite-based network, a proprietary medical network, etc.

FIG. 2 is a block diagram of another example system 200 for detecting network intrusion, according to an illustrative embodiment of the invention. The system 200 illustrated in FIG. 2 may include any number of devices 205, 210, 215, 220. In certain embodiments, the system 200 may also include at least one managing controller 225. Any number of networks 230, 235, 240 and/or network connections may be utilized to facilitate communication between various components of the system 200. For example, as shown in FIG. 2, a device 205 may be in communication with any number of other devices 210, 215, 220 via a plurality of different types of networks and/or networks.

A wide variety of network configurations and arrangements may be utilized as desired in various embodiments of the invention. For example, one or more network configurations may be associated with a utility provider. As one example, any number of local and/or wide area networks may facilitate communications between a device 205 and any number of distributed devices. For example, a control device associated with a utility network may be in communication with various types of distributed devices, such as utility meters, field automation devices, substation control devices, etc., via different types of networks and/or communications interfaces. As another example, a medical controller may be in communication with various distributed devices, such as healthcare claims payers, patient devices, and/or monitoring devices, via various types of medical networks.

With continued reference to FIG. 2, the device 205 will now be described in greater detail. The device 205 may be any suitable device that may be connected to one or more networks, such as an AMI control device, a substation control device, a distributed automation device, a utility field force automation device, a medical control device, and/or an industrial control device. As such, the device 205 may be configured to receive and/or transmit communications to any number of distributed devices 210, 215, 220 via various types of networks 230, 235, 240. Additionally, in certain embodiments, the device 205 may be configured to communicate with a higher level controller, illustrated as a managing controller 225. For example, an AMI control device may communicate with a substation control device or a central utility controller.

The device 205 may include any number of suitable computer processing components that facilitate the general operation of the device 205 and/or the evaluation of communications for network intrusion detection purposes. For example, the device 205 may include one or more controllers or processing devices configured to monitor and evaluate communications. Examples of suitable processing devices that may be incorporated into a device 205 include, but are not limited to, application-specific circuits, microcontrollers, minicomputers, other computing devices, and the like. As such, the device 205 may include any number of processors 250 that facilitate the execution of computer-readable instructions to control the operations of the device 205 and the detection of potential network intrusions. By executing computer-readable instructions, the device 205 may include or form a special purpose computer that facilitates network intrusion detection.

In addition to one or more processor(s) 250, the device 205 may include one or more memory devices 252, one or more input/output ("I/O") interfaces 254, and/or one or more network interface devices 256. The one or more memory devices 252 or memories may be any suitable memory devices, for example, caches, read-only memory devices, random access memory devices, magnetic storage devices, etc. The one or more memory devices 252 may store data, executable instructions, and/or various program modules utilized by the device 205, for example, data files 258, an operating system ("OS") 260, and/or an inspection application 262 or inspection module. The data files 258 may include, for example, information associated with the operation of the device 205, information associated with one or more networks and/or distributed devices, information associated with one or more established communications and/or metadata standards associated with the device 205, one or more generated lists of acceptable content (e.g., white lists, etc.), information associated with generated alert messages, and/or data associated with control actions taken by the device 205.

In certain embodiments of the invention, the device 205 may include any number of software applications or modules that are executed to facilitate the operations of the device 205. The software applications may include computer-readable instructions that are executable by the one or more processors 250. The execution of the computer-readable instructions may form a special purpose computer that facilitates the operations of the device 205 as well as network intrusion detection. As an example of a software application, the device 205 may optionally include an OS 250 that controls the general operation of the device 205 and that facilitates the execution of additional software applications.

Additionally, the device 205 may include an inspection application 262 or inspection module. The inspection application 262 may be a suitable software module configured to facilitate the identification and processing of communications or messages generated by and/or received by the device 205. In operation, the inspection application 262 may build or generate one or more lists of acceptable content for the device 205. For example, the inspection application 262 may identify one or more networks and/or communications interfaces that facilitate device communications. The inspection application 262 may then determine one or more lists of acceptable content (e.g., white lists, etc.) for each of the identified networks and/or communications interfaces. For example, the inspection application 262 may identify one or more established communications standards, device message metadata standards, and/or protocols for a network, and the inspection application 262 may utilize the identified standards and/or protocols to generate one or more lists of acceptable content for the network. The lists of acceptable content may include a wide variety of information, such as valid permutations, formats, lengths, and/or structures for device communications and/or valid metadata associated with device communications. As an alternative to generating a list of acceptable content, the inspection application 262 may identify a list of acceptable content that has been previously stored on the device 205, or the inspection application 262 may obtain a list of acceptable content from an external source. For example, the inspection application 262 may obtain a list of acceptable content from a removable storage device. As another example, the inspection application 262 may obtain a list of acceptable content from an external source (e.g., the managing controller 225) via any number of suitable network communications.

Once one or more lists of acceptable content have been generated and/or obtained, the inspection application 262 may utilize the one or more lists to analyze or evaluate communications generated by and/or received by the device 205. For example, the inspection application 262 may identify a network, communications interface, or communications link associated with an identified communication. The inspection application 262 may then access or determine one or more lists of acceptable content associated with the identified network or communications interface. The inspection application 262 may perform a deep packet inspection of the content (e.g., data payload, etc.) of the communication, and the content may be compared to the lists of acceptable content and/or otherwise evaluated utilizing the lists of acceptable content. Based at least in part upon the evaluation, the inspection application 262 may determine whether the content is acceptable or valid content. If the content is determined to be acceptable content, then the inspection application 262 may approve the communication. If, however, the content is determined to be unacceptable or invalid content (e.g., the content does not match approved content, the content does not satisfy one or more parameters for approved content, etc.), then the inspection application 262 may generate an alert associated with the communication. In certain embodiments, the inspection application 262 may direct communication of an alert message to the managing controller 225 for further processing. In this regard, the managing controller 225 may determine whether a network intrusion has occurred, and the managing controller 225 may direct one or more control actions in response to the determination. For example, the managing controller 225 may communicate instructions to the device 205 for processing future communications. In other embodiments, the inspection application 262 may direct one or more control actions in response to a generated alert. As explained in greater detail above with reference to the system 100 of FIG. 1, a wide variety of control actions may be taken as desired in various embodiments of the invention.

Indeed, the inspection application 262 may perform a wide variety of different operations to evaluate communications and determine whether content included in communications is acceptable or valid content. The operations described above are provided by way of example only. Another example of the operations that may be performed by the inspection application 262 is described in greater detail below with reference to FIG. 5.

With continued reference to the device 205, the one or more I/O interfaces 254 may facilitate communication between the device 205 and one or more input/output devices, for example, one or more user interface devices, such as a display, keypad, mouse, pointing device, control panel, touch screen display, microphone, speaker, etc., that facilitate user interaction with the device 205. In this regard, user commands may be received by the device 205. Additionally, the one or more network interface devices 256 may facilitate connection of the device 205 to any number of suitable networks, such the networks 230, 235, 240 illustrated in FIG. 2. In this regard, the device 205 may receive data from and/or communicate data to other components of the system 200. As desired in certain embodiments, the network interface devices 256 may include any suitable communications interfaces, network cards, and/or other devices configured to communicate with other devices 210, 215, 220 and/or the managing controller 225 via any number of wide area networks or other networks. For example, the network interface devices 256 may include Ethernet cards, network interface cards, cellular transceivers, broadband over power line adaptors, and/or other devices.

With continued reference to FIG. 2, the managing controller 225 may be similar to the managing controller 120 described above with reference to FIG. 1. Additionally, each of the other devices 210, 215, 220 may include components similar to the device 205 and/or to the device 105 described above with reference to FIG. 1. The various networks 230, 235, 240 may include any suitable networks that facilitate communications between devices, such as local area networks, wide area networks, Bluetooth-enabled networks, Wi-Fi enabled networks, cellular networks, radio frequency networks, private networks, public-switched networks, etc. As desired, a device may be configured to communicate via any number of networks. For example, a utility control device may be configured to communicate via a plurality of utility networks (e.g., AMI networks, Fieldbus networks, etc.). In the event that a device communicates via a plurality of networks, different lists of acceptable content may be determined for each network.

As desired, embodiments of the invention may include systems with more or less than the components illustrated in FIGS. 1 and 2. Additionally, certain components of the systems 100, 200 may be combined in various embodiments of the invention. The systems 100, 200 of FIGS. 1 and 2 are provided by way of example only.

As desired, embodiments of the invention may be utilized in a wide variety of applications, such as utility applications, medical applications, and/or industrial control applications. In certain embodiments, the types of messages and/or communications that are communicated may be relatively limited due to the specialized nature of the application. For example, a relatively limited number of different types of applications may be communicated between various components of a utility network. FIG. 3 is a block diagram of one utility application 300 in which various embodiments of the invention may be utilized.

With reference to FIG. 3, various components of a utility application 300 may be in communication with one another via any number of suitable networks. For example, home area network ("HAN") devices 310 may be in communication with respective utility meters 315 associated with various customers of a utility provider. The utility meters 315 may in turn be in communication with a suitable AMI subsystem 320 that facilitates communication with any number of other components of the utility application 300, such as an operations subsystem 325. As desired, the utility meters 315 may be in communication with one another via one or more mesh networks. Additionally, certain utility meters 315 (or a mesh network controller) may be in communication with the AMI subsystem 320 via any number of AMI networks.

With continued reference to FIG. 3, the operations subsystem 325 may also be in communication with any number of other utility components, such as a power plant subsystem 330, any number of distributed energy subsystems 335 (e.g., photovoltaic cells subsystems, wind turbine subsystems, etc.), any number of Fieldforce subsystems 340, any number of distributed automation subsystems 345 and/or any number of substation automation subsystems 350. Additionally, the operations subsystem 325 may be in communication with an enterprise subsystem 355. Although the operations subsystem 325 is described as being in communication with a plurality of other devices, any components of the application 300 may be in communication with one another via the networks 305.

According to an aspect of the invention, one or more lists of acceptable content may be established or determined for each type of network interface and/or network described for the utility application 300. For example, a utility meter 315 may include a list of acceptable content for communications received from other utility meters, a list of acceptable content for communications received from a HAN device, and/or a list of acceptable content for communications received from an AMI subsystem 320. As another example, the operations subsystem 325 may include respective lists of acceptable content associated with the various components of the application 300 in communication with the operations subsystem 325. As desired, each device or subsystem may evaluate or analyze communications utilizing the lists of acceptable content. In this regard, a device may determine whether the content of a communication is valid or acceptable content, and the device may identify potential security risks and/or network instructions.

The utility application 300 illustrated in FIG. 3 is provided by way of example only. As desired, embodiments of the invention may be utilized with other types of applications, such as medical applications and/or industrial control applications.

FIG. 4 is a flow diagram of an example method 400 for analyzing communications to facilitate network intrusion detection, according to an illustrative embodiment of the invention. The method 400 may be utilized in association with one or more network-based systems, such as the system 100 illustrated in FIG. 1. In certain embodiments, the operations of the method 400 may be performed by at least one device and a managing controller, such as the device 105 and managing controller 120 illustrated in FIG. 1.

The method 400 may begin at block 405. At block 405, a communication inspection application, such as the inspection application 152 illustrated in FIG. 1, may be installed on the device 105. In certain embodiments, a technician or other individual may install the inspection application 152 on the device 105. For example, a technician may install the inspection application 152 from a portable memory device. In other embodiments, the inspection application 152 may be communicated to the device from another device or system, such as the managing controller 120. For example, the inspection application 152 may be communicated to the device 105 and installed as part of a software update. Once installed, the inspection application 152 may be executed by the device 105 in order to facilitate the analysis of communications for intrusion detection purposes.

At block 410, a device type may be identified by the inspection application 152. For example, the inspection application 152 may utilize identifying information for the device 105, such as a device identifier or a model number to identify a device type. In this regard, the inspection application 152 may be a relatively generic application that may be utilized by a wide variety of different types of devices. In certain embodiments, the device type may be entered into the device 105 for receipt and processing by the inspection application 152. In other embodiments, the device type may be identified by the inspection application 152 based upon information received from other modules or applications executed by the device 105.

At block 415, a list of acceptable content, such as a white list, may be determined for the device 105. In certain embodiments, the list of acceptable content may be determined based at least in part upon an identification of the device type. For example, a device type may be utilized to determine or identify a communications interface or network interface for facilitating device communications. As one example, if the device is a utility meter, the device type may be utilized to identify a utility meter network interface or communications interface. As desired, one or more established communications standards, message metadata standards, and/or communications protocols associated with device communications and/or the communications interface may be identified or determined. Utilizing the example of a utility meter, various utility meter data format standards (e.g., International Electrotechnical Commission ("IEC") 61850, IEC 61968, a ZigBee profile standard (e.g., Smart Energy Profile 1.0, Smart Energy Profile 2.0, etc.), a North America Energy Standards Board ("NAESB") Energy Services Provider Interface standard, etc.) may be determined. The standards and/or protocols may then be utilized to determine or generate a list of acceptable content for communications. For example, a standard may be utilized to determine valid permutations for data included in communications, such as lengths and formats for measurements and/or readings, lengths and formats for device identifiers, and/or structures and/or sequences for ordering data within a communication. As desired, a wide variety of different types of processing parameters for valid or acceptable content may be included in an acceptable content list.

At block 420, a next communication associated with the device 105 may be identified. For example, a communication received by the device 105 from another device via a communications network may be identified. At block 425, the content of the communication may be evaluated or analyzed utilizing the list of acceptable content for the device. For example, a deep packet inspection of the data payload of the communication may be identified, and the content included in the data payload may be evaluated utilizing the list of acceptable content. A wide variety of suitable methods and/or techniques may be utilized to evaluate the content. For example, a determination may be made as to whether the content matches approved content included in the list of acceptable content. As another example, a determination may be made as to whether the content satisfies one or more parameters or rules (e.g., sequencing rules, structuring rules, formatting rules, etc.) included in the list of acceptable content.

At block 430, a determination may be made as to whether the content included in the communication is valid or acceptable content. For example, a determination may be made as to whether the content matches acceptable content included in the list of acceptable content and/or whether the content satisfies one or more rules or parameters included in the list of acceptable content. If it is determined at block 430 that the content is valid content, then the communication may be approved and operations may continue at block 420 described above. If, however, it is determined at block 430 that the content is invalid or unacceptable content, then operations may continue at block 435.

At block 435, an alert message associated with the identified invalid content and/or the underlying communication may be generated. A wide variety of information may be included in the alert message, such as an identifier of the device 105, information associated with the invalid content, identifiers of an originating device for the communication, identifiers of one or more intermediate devices that may have altered a communication, location information for the device 105, and/or location information and/or timing information associated with the originating and/or intermediate devices. Once generated, the alert message may be output by the device for communication to one or more recipients, such as to the managing controller 120.

At block 440, the managing controller 120 may receive the alert message output by the device 105. At block 445, the managing controller 120 may analyze the alert message (and any alert messages received from other devices). At block 450, the managing controller 120 may identify any potential security threats and/or network intrusions based at least in part upon an analysis of the alert message. For example, the managing controller 120 may identify an originating device of the communication or a device that altered the communication as a potential security threat within the network. In certain embodiments, a security threat may be identified based upon the receipt of a plurality of alert messages. For example, multiple devices in communication with an originating device may generate respective alert messages that are processed to identify a security threat. A wide variety of methods and/or techniques may be utilized to facilitate the identification of a potential security threat or network intrusion.

In certain embodiments, one or more requests for location information associated with a device identified as a potential security threat may be output by the managing controller 120 for communication to one or more other devices, such as devices that generated alert messages. A device 105 may receive a request for location information, and location information may be communicated to the managing controller 120 in response to the request. Location information may be received by the managing controller 120 from any number of devices. As an alternative to requesting location information, location information may be included in one or more alert messages and identified by the managing controller 120. A wide variety of location information may be received by the managing controller 120, such as locations (e.g., global positioning coordinates, stored locations, street addresses, etc.) of one or more devices that triggered alerts, and/or timing information associated with communications between the devices and the device that poses a security threat.

As desired, a position or location of the device that is a potential security threat may be determined, calculated, or approximated by the managing controller 120. A wide variety of suitable techniques may be utilized to determine a device position. As one example, radio triangulation may be utilized to determine a position. For example, the positions of devices that triggered alerts may be utilized in conjunction with timing information, such as message response time between one or more of the devices and the device that is a potential security threat, in order to extrapolate an estimated position for the device. In this regard, the location of potential security risks within a network may be determined.

At block 455, any number of control actions may be determined and directed by the managing controller 120. A control action may be any suitable action intended to minimize or reduce the security risks with respect to an identified device that has been identified as posing an intrusion or security risk. For example, a control action may minimize the data that is potentially compromised by being communicated to the device. A wide variety of different control actions may be utilized as desired in various embodiments of the invention. For example, the managing controller 120 may direct other devices to not communicate messages to or process messages received from the device that poses a security threat. As illustrated in FIG. 4, at block 460, the managing controller 120 may communicate instructions (e.g., instructions for processing further communications) to one or more other devices. The instructions may be received and processed by a device 105 at block 465. As another example of a control action, the managing controller 120 may direct the dispatch of a technician to the determined location of the intruding device.

The method 400 may end following block 465.

FIG. 5 is a flow diagram of another example method 500 for analyzing communications to facilitate network intrusion detection, according to an illustrative embodiment of the invention. The method 500 may be utilized in association with one or more network-based systems, such as the system 200 illustrated in FIG. 2. In certain embodiments, the operations of the method 500 may be performed by at least one device, such as the device 205 illustrated in FIG. 2.

The method 500 may begin at block 505. At block 505, one or more communications channels, communications links, and/or network interfaces associated with the device 205 may be identified. For example, one or more networks that facilitate device communications may be identified, and one or more different types of communications links for the networks may be identified. As one example, if the device is a power substation device, one or more communications interfaces that facilitate communications with utility meters, AMI controllers, field automation devices, and/or other types of devices may be identified.

At block 510, one or more respective communications standards, metadata standards, and/or communications protocols associated with the various communications channels and/or links may be identified or determined. Additionally, in certain embodiments, one or more respective communications standards, metadata standards, and/or protocols may be identified for various types of communications that may be received via a single communications link. For example, in a utility application, an AMI communications link may be utilized to receive messages output by utility meters as well as messages associated with the operation of AMI control devices. The various standards and/or protocols may then be utilized at block 515 to determine or generate respective lists of acceptable content for communications received via the various communications channels. For example, a standard may be utilized to determine valid permutations for data included in communications for a communications link, such as lengths and formats for measurements and/or readings, lengths and formats for device identifiers, and/or structures and/or sequences for ordering data within a communication. As desired, a wide variety of different types of processing parameters for valid or acceptable content may be included in an acceptable content list.

At block 520, a next communication associated with the device 205 may be identified. For example, a communication received by the device 205 from another device via a communications network may be identified. At block 525, a list of acceptable content for analyzing or evaluating the communication may be identified or determined. For example, a type associated with the communication and/or a communications link associated with the communication may be identified, and a list of acceptable content may be determined based at least in part upon the communications link and/or the type of communication.

At block 530, the content of the communication may be evaluated or analyzed utilizing the list of acceptable content for the device. For example, a deep packet inspection of the data payload of the communication may be identified, and the content included in the data payload may be evaluated utilizing the list of acceptable content. A wide variety of suitable methods and/or techniques may be utilized to evaluate the content. For example, a determination may be made as to whether the content matches approved content included in the list of acceptable content. As another example, a determination may be made as to whether the content satisfies one or more parameters or rules (e.g., sequencing rules, structuring rules, formatting rules, etc.) included in the list of acceptable content.

At block 535, a determination may be made as to whether the content included in the communication is valid or acceptable content. For example, a determination may be made as to whether the content matches acceptable content included in the list of acceptable content and/or whether the content satisfies one or more rules or parameters included in the list of acceptable content. If it is determined at block 535 that the content is valid content, then the communication may be approved and operations may continue at block 520 as described above. If, however, it is determined at block 535 that the content is invalid or unacceptable content, then operations may continue at block 540.

At block 540, a control action may be directed by the device 205 based upon the identification of invalid content. In certain embodiments, a control action may include the generation of an alert message associated with the identified invalid content and/or the underlying communication. Once generated, the alert message may be output by the device 205 for communication to one or more recipients, such as a managing controller. As desired an alert message may be processed by a recipient in a similar manner as that described above with reference to the method 400 of FIG. 4.

In other embodiments, a control action may include the identification of a potential security threat or network intrusion and/or a device associated with the security threat (e.g., an originating device for a communication, etc.). The device 205 may then take any suitable action intended to minimize or reduce the security risks with respect to a device that has been identified as posing an intrusion or security risk. For example, the device 205 may take control actions to minimize the data that is potentially compromised by being communicated to the intruding device. A wide variety of different control actions may be utilized as desired in various embodiments of the invention. For example, the device 205 may limit or suspend the processing of communications received from the intruding device. As another example, the device 205 may direct other devices to not communicate messages to or process messages received from the intruding device. As desired, the device 205 may communicate instructions (e.g., instructions for processing further communications) to one or more other devices. As yet another example of a control action, the device 205 may direct the dispatch of a technician to the determined location of the intruding device.

The method 500 may end following block 540.

The operations described and shown in the methods 400, 500 of FIGS. 4-5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 4-5 may be performed.

The invention is described above with reference to block and flow diagrams of systems, methods, apparatus, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A device, comprising:
at least one memory configured to store computer-executable instructions; and
at least one processor configured to access the at least one memory and execute the computer-executable instructions to:
identify a communication comprising measurement data associated with consumption of a utility, the communication received over a mesh network of a plurality of devices comprising the device;
determine that a type of the device comprises a utility meter;
generate, based at least in part upon a data format standard associated with the utility meter, a list of acceptable content, wherein the list of acceptable content comprises a format for the measurement data, a sequence for ordering the measurement data, and a length of the measurement data;
analyze, based at least in part upon the generated list, the content in the communication;
determine, based at least in part upon the analysis, whether the content is acceptable content; and
when it is determined that the content is acceptable, send the communication to at least one other device of the plurality of devices over the mesh network.

2. The device of claim 1, wherein the at least one processor is configured to identify the one or more networks utilized by the type of the device by executing the computer-executable instructions to:
identify a communications link associated with the communication; and
identify the one or more networks based at least in part upon the identified communications link.

3. The device of claim 1, wherein the generation is further based at least in part on at least one of (i) one or more communication standards, (ii) one or more metadata standards, or (iii) one or more protocols associated with the type of the device or the one or more networks.

4. The device of claim 1, wherein the at least one processor is configured to analyze the content by executing the computer-executable instructions to perform a deep packet inspection of the communication.

5. The device of claim 1, wherein it is determined that the content is not acceptable content, and wherein the at least one processor is further configured to execute the computer-executable instructions to direct a control action based at least in part upon the determination.

6. The device of claim 5, wherein the communication comprises a communication received by the device, and
wherein the at least one processor is further configured to execute the computer-executable instructions to identify an originating device for the communication as an invalid device, wherein the identification of the originating device comprises:
sending a request for location information associated with the originating device; and
receiving the location information.

7. The device of claim 5, wherein the control action comprises the communication of an alert message to a managing controller.

8. The device of claim 1, wherein the communication comprises a first communication, and
wherein the at least one processor is further configured to execute the computer-executable instructions to:
receive an alert message output by another device, wherein the alert message is generated based upon the analysis of a second communication by the other device; and
analyze the alert message to identify a security risk.

9. A method comprising:
identifying a communication comprising measurement data associated with consumption of a utility, wherein the communication is received over a mesh network of a plurality of devices comprising a device;

determining that a type of the device comprises a utility meter;

generating, based at least in part upon a data format standard associated with the utility meter, a list of acceptable content, wherein the list of acceptable content comprises a format for the measurement data, a sequence for ordering the measurement data, and a length of the measurement data;

analyzing, based at least in part upon the generated list, the content in the communication;

determining, based at least in part upon the analysis, whether the content is acceptable content; and when it is determined that the content is acceptable, send the communication to at least one other device of the plurality of devices over the mesh network, wherein the above operations are performed by a communication inspection application executed by one or more processors associated with the device.

10. The method of claim 9, the method further comprising identifying one or more networks, wherein identifying the one or more networks comprises:

identifying a communications link associated with the communication; and identifying the one or more networks based at least in part upon the identified communications link.

11. The method of claim 9, wherein the generation comprises generating a white list associated with the data format standard.

12. The method of claim 9, wherein analyzing the content comprises performing a deep packet inspection of the communication.

13. The method of claim 9, wherein it is determined that the content is not acceptable content, and further comprising:

directing a control action based at least in part upon the determination that the content is not acceptable content.

14. The method of claim 13, wherein identifying the communication comprises identifying a communication received by the device, and further comprising:

identifying an originating device for the communication as an invalid device, wherein the identification of the originating device comprises:

sending a request for location information associated with the originating device; and receiving the location information.

15. The method of claim 13, wherein directing the control action comprises directing the communication of an alert message to a managing controller.

16. The method of claim 13, wherein identifying the communication comprises identifying a first communication, and further comprising:

receiving an alert message output by another device, wherein the alert message is generated based upon the analysis of a second communication by the other device; and analyzing the alert message to identify a security risk.

17. The device of claim 1, wherein the measurement data comprises at least one of gas, water, or electricity.

\* \* \* \* \*